(12) United States Patent
Clapper

(10) Patent No.: US 7,030,868 B2
(45) Date of Patent: *Apr. 18, 2006

(54) CONTROLLING DISPLAYS FOR PROCESSOR-BASED SYSTEMS

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/762,850

(22) Filed: Jan. 22, 2004

(65) Prior Publication Data

US 2004/0150635 A1 Aug. 5, 2004

Related U.S. Application Data

(63) Continuation of application No. 09/405,575, filed on Sep. 27, 1999, now Pat. No. 6,704,007.

(51) Int. Cl.
*G09G 5/00* (2006.01)
(52) U.S. Cl. ...................... 345/204; 345/158
(58) Field of Classification Search ........... 345/121, 345/126, 158, 352, 681, 905, 204, 205, 169, 345/437, 156, 162, 168, 699, 583; 361/681, 361/695, 683, 680; 340/720, 723; 382/296, 382/297; 348/583; 400/472; 353/122

See application file for complete search history.

(56) References Cited

U.S. PATENT DOCUMENTS

| | | | | |
|---|---|---|---|---|
| 4,831,368 A | * | 5/1989 | Masimo et al. | 345/27 |
| 4,992,959 A | * | 2/1991 | Hamada et al. | 358/1.11 |
| 5,134,390 A | * | 7/1992 | Kishimoto et al. | 345/659 |
| 5,798,750 A | * | 8/1998 | Ozaki | 345/656 |
| 5,936,619 A | * | 8/1999 | Nagasaki et al. | 345/205 |
| 6,115,025 A | * | 9/2000 | Buxton et al. | 345/659 |
| 6,137,468 A | * | 10/2000 | Martinez et al. | 345/649 |
| 6,330,149 B1 | * | 12/2001 | Burrell | 361/683 |
| 6,433,791 B1 | * | 8/2002 | Selli et al. | 345/659 |
| 6,704,007 B1 | * | 3/2004 | Clapper | 345/204 |

FOREIGN PATENT DOCUMENTS

SG  72719 A1 * 5/2000

* cited by examiner

*Primary Examiner*—Vijay Shankar
*Assistant Examiner*—Nitin Patel
(74) *Attorney, Agent, or Firm*—Trop, Pruner & Hu, P.C.

(57) ABSTRACT

A processor-based system may include a display and a sensor which detects the orientation of the display with respect to the rest of the system. As the system is displaced, the sensor detects the orientation of the system. The system may automatically alter a characteristic of information displayed on the display in response to the detection of a change in orientation.

7 Claims, 7 Drawing Sheets

CONTROLLING DISPLAYS FOR PROCESSOR-BASED SYSTEMS

This is a continuation of prior application Ser. No. 09/405,575, filed Sep. 27, 1999 now U.S. Pat. No. 6,704,007.

BACKGROUND

This invention relates generally to processor-based systems and to controlling the display of information on displays associated with processor-based systems.

A variety of processor-based systems include a housing and a display coupled to the housing. For example, a conventional laptop computer includes a housing having a keyboard and a display screen which may be, for example, a liquid crystal display. The orientation of the display with respect to the housing may be adjustable through a hinge connection between the display and the housing.

A variety of hand-held devices including personal digital assistants (PDAs) may also have displays. Many hand-held or portable devices are usable in a variety of different orientations. In many cases, the displays may be rectangular so that some information may be displayed along the length direction of the screen and other information may be displayed along the width direction.

However, generally, displays work in only one direction. That is, information is always displayed in the same orientation, normally driven by software, regardless of the display's orientation. As a result, in some cases, the display of information may be unsuitable for the orientation of the display. For example, the angulation of the display with respect to the user may make it difficult to view material on the display. In addition, the user can not readily control the orientation of information set forth on the display.

Thus, there is a continuing need for better ways to control displays used in processor-based systems.

SUMMARY

In accordance with one aspect, a method of displaying information on a processor-based system includes detecting the orientation of the display coupled to the system. A characteristic of the information displayed on the display is changed in response to the detected orientation of the display.

Other aspects are set forth in the accompanying detailed description and claims.

DETAILED DESCRIPTION

Figure 1:
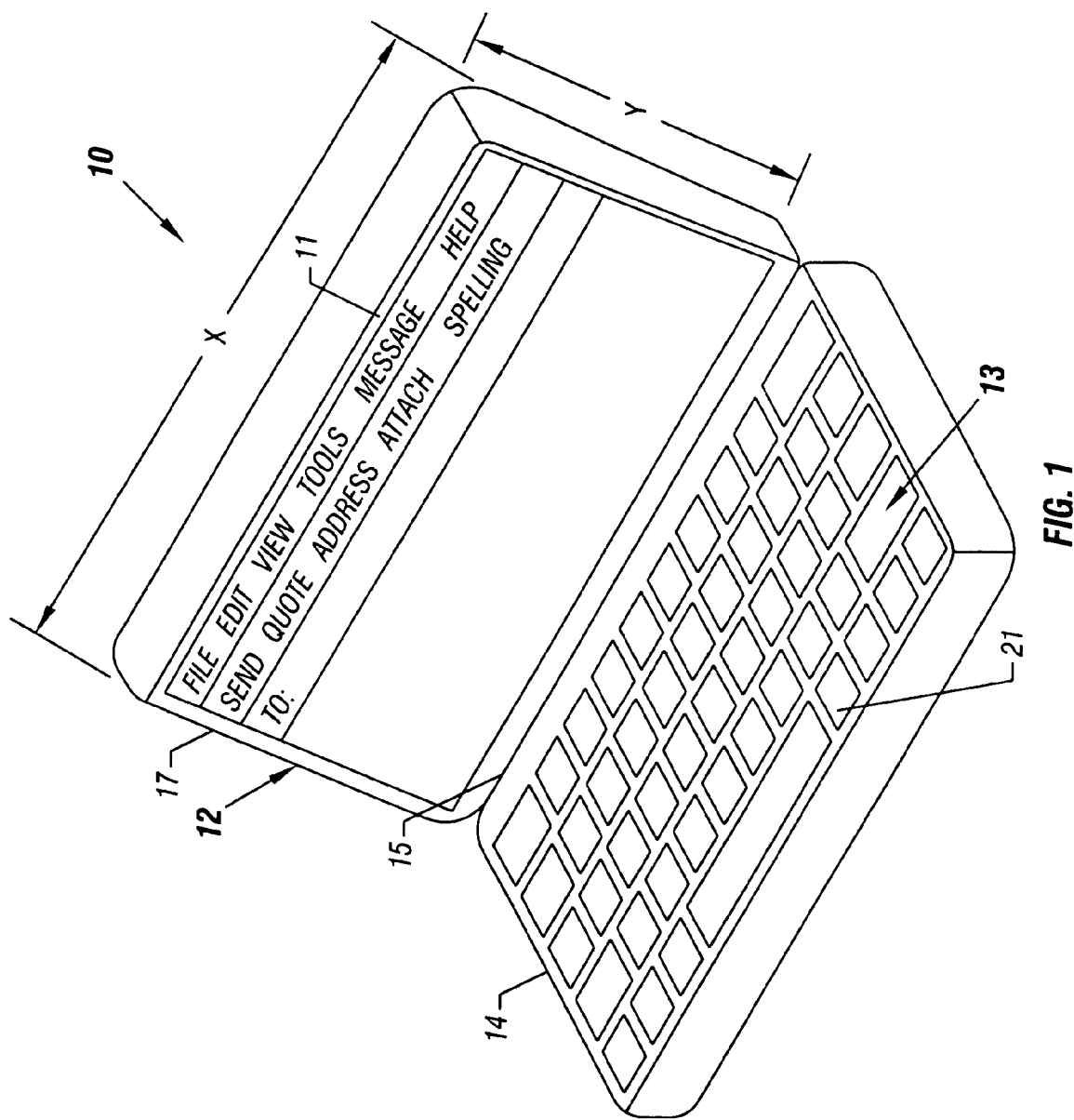
FIG. 1 is a perspective view of one embodiment of the present invention in a first orientation.

A processor-based system 10 may include a housing 14 coupled to a display 12, as shown in FIG. 1. The display 12 may be coupled by a hinge 15 to the housing 14. The housing 14 may conventionally include a keyboard 13 in one embodiment of the present invention.

While the present invention is illustrated in a format commonly associated with personal digital assistants (PDAs), the present invention is applicable to a variety of other embodiments. In some embodiments of the present invention, the system may be a portable processor-based system which is operated by battery power. In addition, in some embodiments of the present invention, the processor-based system 10 may be hand-held as illustrated in FIG. 1.

The display 12 may be arranged in a rectangular format having a longer axis X and a shorter axis Y. In the embodiment shown in FIG. 1, the displayed information extends from left to right along the X axis and up and down in Y axis. Thus, the upper edge 11 of the display 12 corresponds to the top of the textual material.

Figure 2:
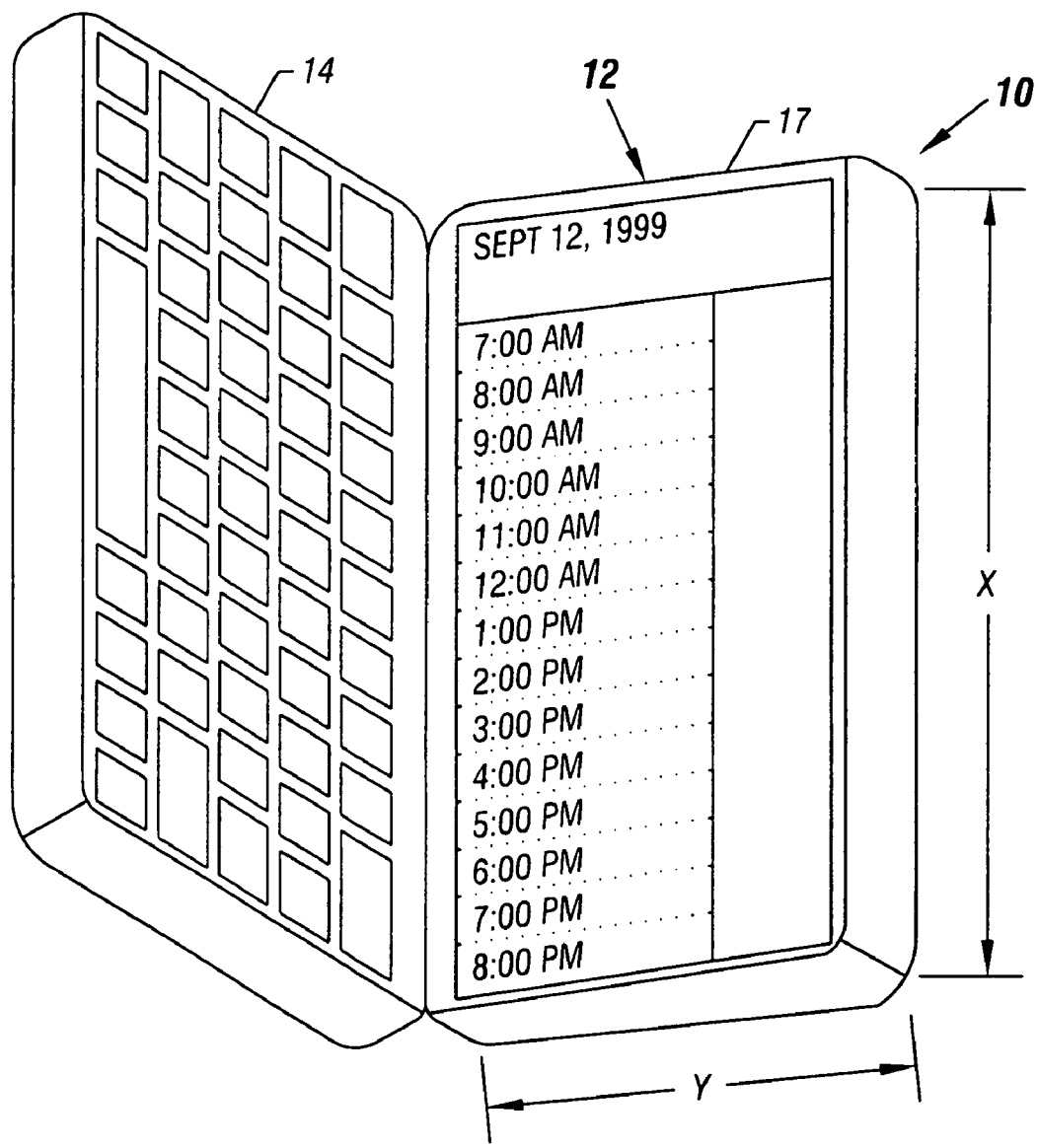
FIG. 2 is a perspective view of the embodiment shown in FIG. 1 in a different orientation.

Referring to FIG. 2, the display 10 has been rotated approximately 90°. The housing 14 and the display 12 have been rotated to the right. Now the display 12 has a more upright configuration. Information displayed on the display 12 now uses the side edge 17 as the upper edge for purposes of displaying text. In other words, the textual information now extends up and down in the X axis and the across in the Y axis using the convention set forth in connection with FIG. 1.

Thus, in one embodiment of the invention, the system 10 automatically changes the orientation of the displayed information in response to the detection of tilting or orientation of the system 10. These changes maybe implemented automatically in response to the detection of rotation of approximately 90° of the housing 10. Thus, if the user wishes to rotate the way information is displayed on the display 12, the user can do so by simply rotating the entire system 10 from the orientation shown in FIG. 1 to the orientation shown in FIG. 2.

Figure 3:
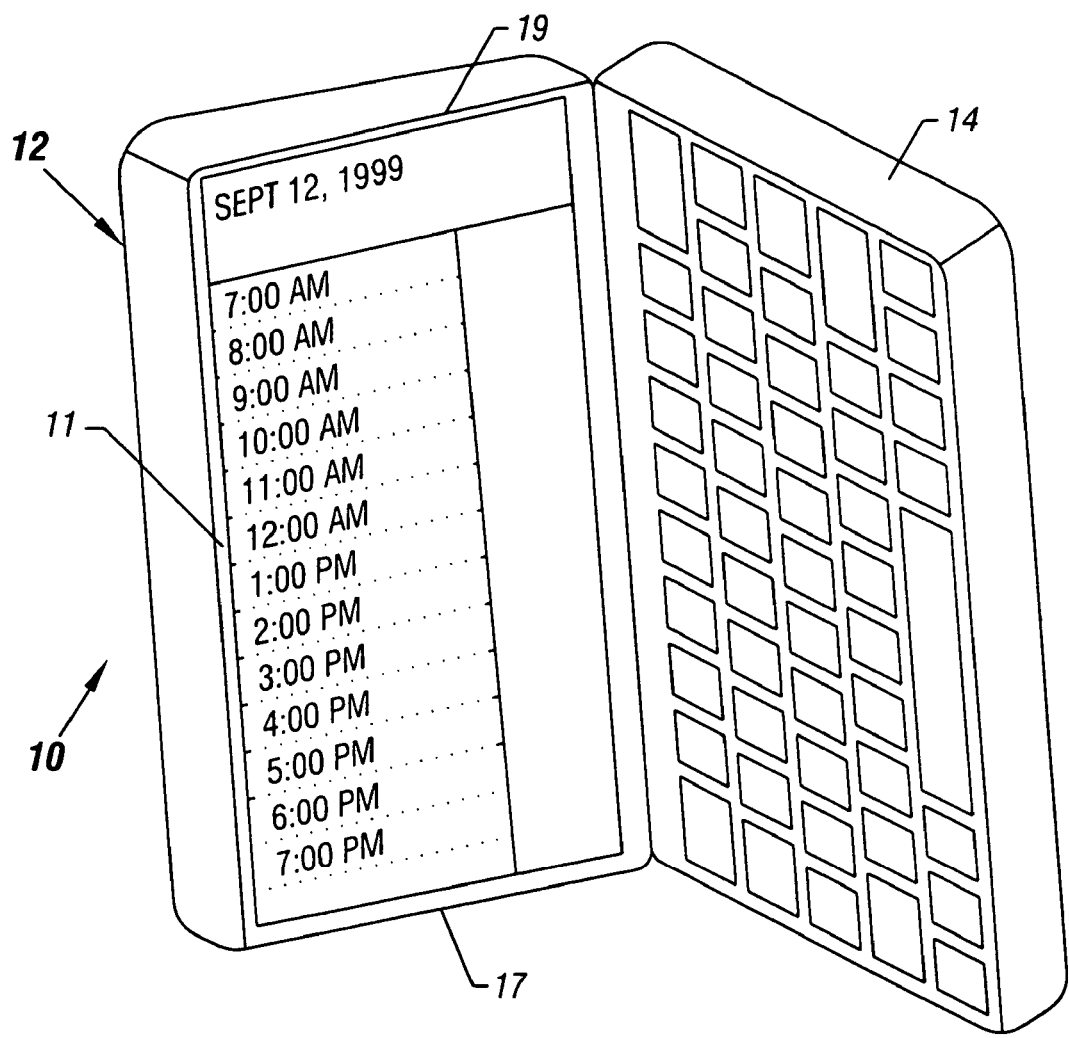
FIG. 3 is a perspective view of the display of FIG. 1 in still another orientation.

While the embodiment shown in FIG. 2 may be convenient for a left-handed or a right-handed person, the system 10 can be rotated 180° from the configuration shown in FIG. 2 to the configuration shown in FIG. 3. As a result, the text displayed on the display 12 may be similarly rotated through 180° so that the upper edge of the text is now aligned with the edge 19 of the display 12, in one embodiment of the invention. Again, the transpositioning of the text on the display 12 may be implemented automatically in response to detection of the rotation of the system 10 from the orientation shown in FIG. 2 to another orientation.

Figure 4:
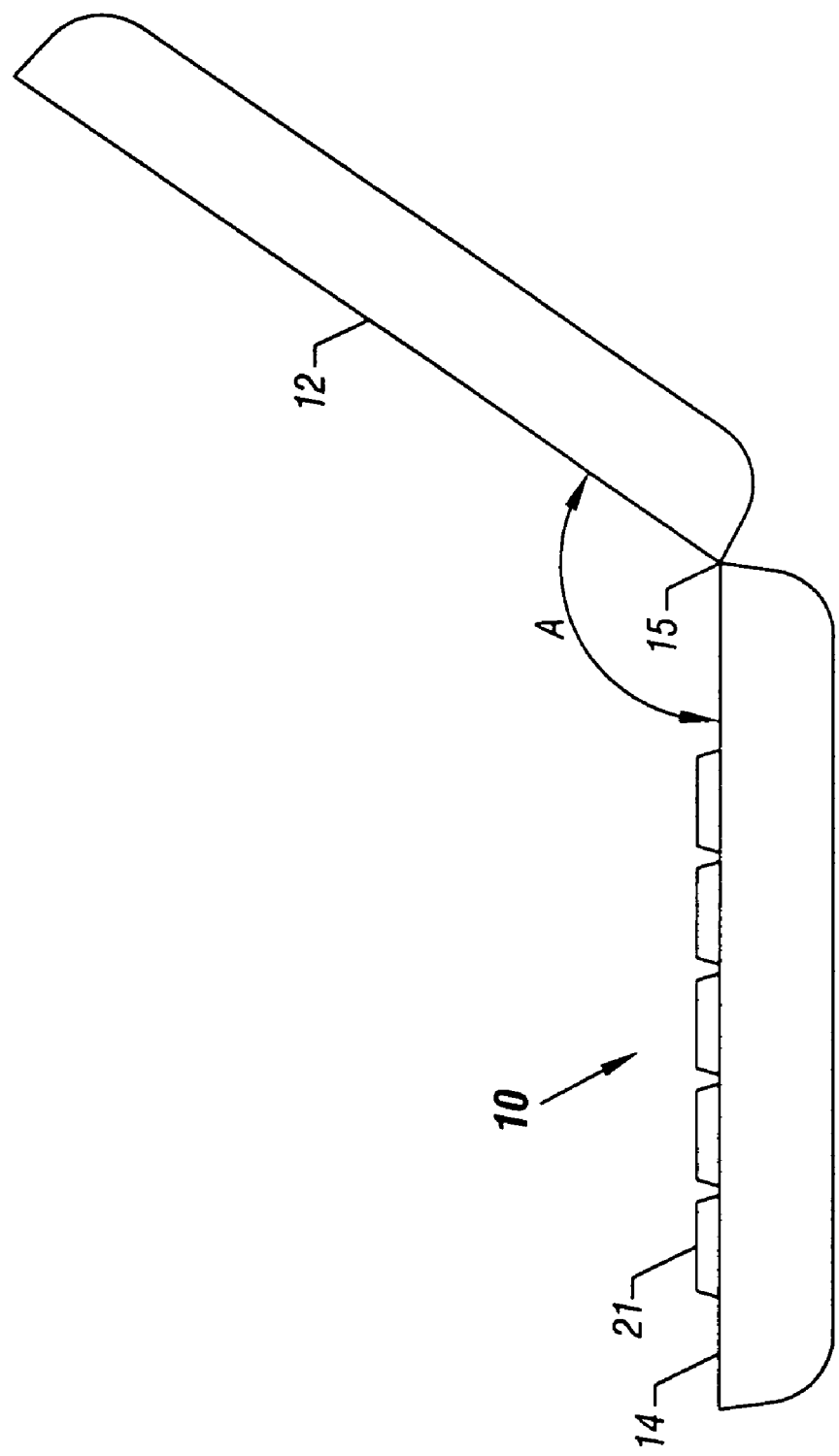
FIG. 4 is an enlarged, side elevational view of the display shown in FIG. 1.

Referring now to FIG. 4, the system may also detect the rotation of the display 12 with respect to the housing 14 around the hinge 15. As the display 12 rotates, as indicated by the angle A, the orientation of the characters on the display may be changed so that regardless of the orientation of the display, a fixed user still sees letters in substantially the same orientation. Thus, the aspect ratio of information displayed on the display may be altered, for example by making the letters taller or shorter. Thus text may have the same appearance with respect to a fixed point of view regardless of the angle through which the display 12 is rotated relative to the housing 14.

In each of the instances described above, a characteristic of the display is altered in response to a change in orientation of the system 10. The characteristic that may be changed may include, among other things, the orientation of textual material on the display, the aspect ratio of characters displayed on the display and how information on the display may be actuated, for example, in response to a mouse-type cursor control system. In addition, other characteristics may also be modified in response to orientation changes.

In another embodiment of the present invention, the detected orientation of the display may be used to improve the display quality. For example, at some orientations of the display with respect to the user, the display may be washed out or may be subject to contrast reversal. In such cases, by recognizing the orientation of the display with respect to the user, the system may adjust the contrast based on the display orientation. This may help to ameliorate contrast reversal or wash out. In some embodiments of the present invention, the display and associated processor-based system may be able to deduce the orientation of the user with respect to the display. For example, the way the user moves the display to improve the view of the display may give information about where the user's eyes are positioned with respect to the display. This information may be useful in overcoming contrast reversal or wash out and may assist in adjusting the contrast to improve the quality of the display.

In some embodiments, the function of the various keys 21 making up the keyboard 13 may also be altered in response to orientation changes. That is, a given key may signify different input commands in different orientations of the system 10 with respect to a preset orientation, such as the one depicted in FIG. 1. In other words, the assignments of key functions may be altered in response to detection of the orientation of the system 10 with respect to gravity.

In still another embodiment of the present invention, the reorientation of the system 10 may be recognized as a software trigger or input command. For example, in response to the change of the system 10 from the orientation shown in FIG. 1 to that shown in FIG. 2, the system may automatically switch from running an e-mail program to running a calendar or scheduling program. In such case, the change in orientation automatically selects a different application program to run on the system 10. In some cases, a particular application program may be associated with a given orientation. In some embodiments, a given application may be better suited to displaying information in one orientation and thus the application may be invoked whenever the system 10 assumes that orientation. In other cases the orientation is merely an arbitrary software trigger.

In addition, the orientation change may provide an input signal to select a given feature in an application program already running, as another example. For example, a given rotation of the display may be recognized as accepting or answering "yes" to an option offered by software running on the system 10.

Figure 5:
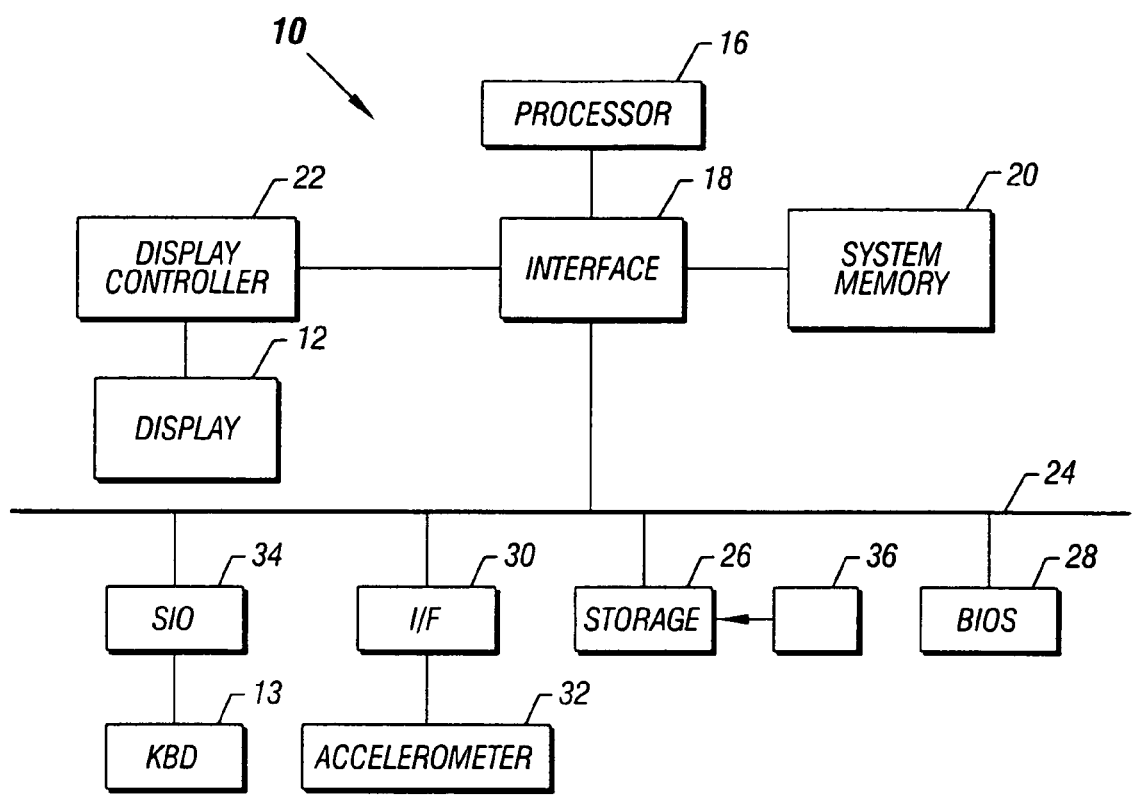
FIG. 5 is a schematic or block depiction for one embodiment for implementing the display shown in FIG. 1.

Referring next to FIG. 5, the system 10, within the housing 14, may include a processor 16 coupled to an interface 18. The interface 18, for example, may be a chipset or a bridge. The interface 18 may couple a bus 24, a system memory 20, and a display controller 22. The display controller 22 may in turn be coupled to the display 12.

The bus 24 may be coupled through an interface 30 to a accelerometer 32. In some embodiments of the present invention, the accelerometer 32 may be a solid state accelerometer which measures acceleration along at least two transverse axes. In other embodiments of the present invention, the accelerometer 32 may measure gravitational components along three transverse axes. In some cases, two or more accelerometers, oriented at an angle with respect to one another, may be utilized. The interface 30 is responsible for receiving information about the display's orientation and converting it to a format usable by software operating on the system 10.

A serial input/output (SIO) device 34 may be coupled to the keyboard 13. A storage device 26 may store software 36 for operating the system 10. The device 26 may store the software 36 for changing a characteristic of the display in response to the detected orientation of the system 10. Conventionally, the system may also store other software such as an operating system and application software. The storage 26 may conventionally be a hard disk drive or, in connection with battery powered or portable systems, the storage 26 may be implemented in whole or in part by a flash memory. A basic input/output system (BIOS) may be stored in a memory 28 also coupled to the bus 24. While one embodiment of hardware for implementing the present invention is illustrated in FIG. 5, those skilled in the art will appreciate numerous other variations.

Figure 6:
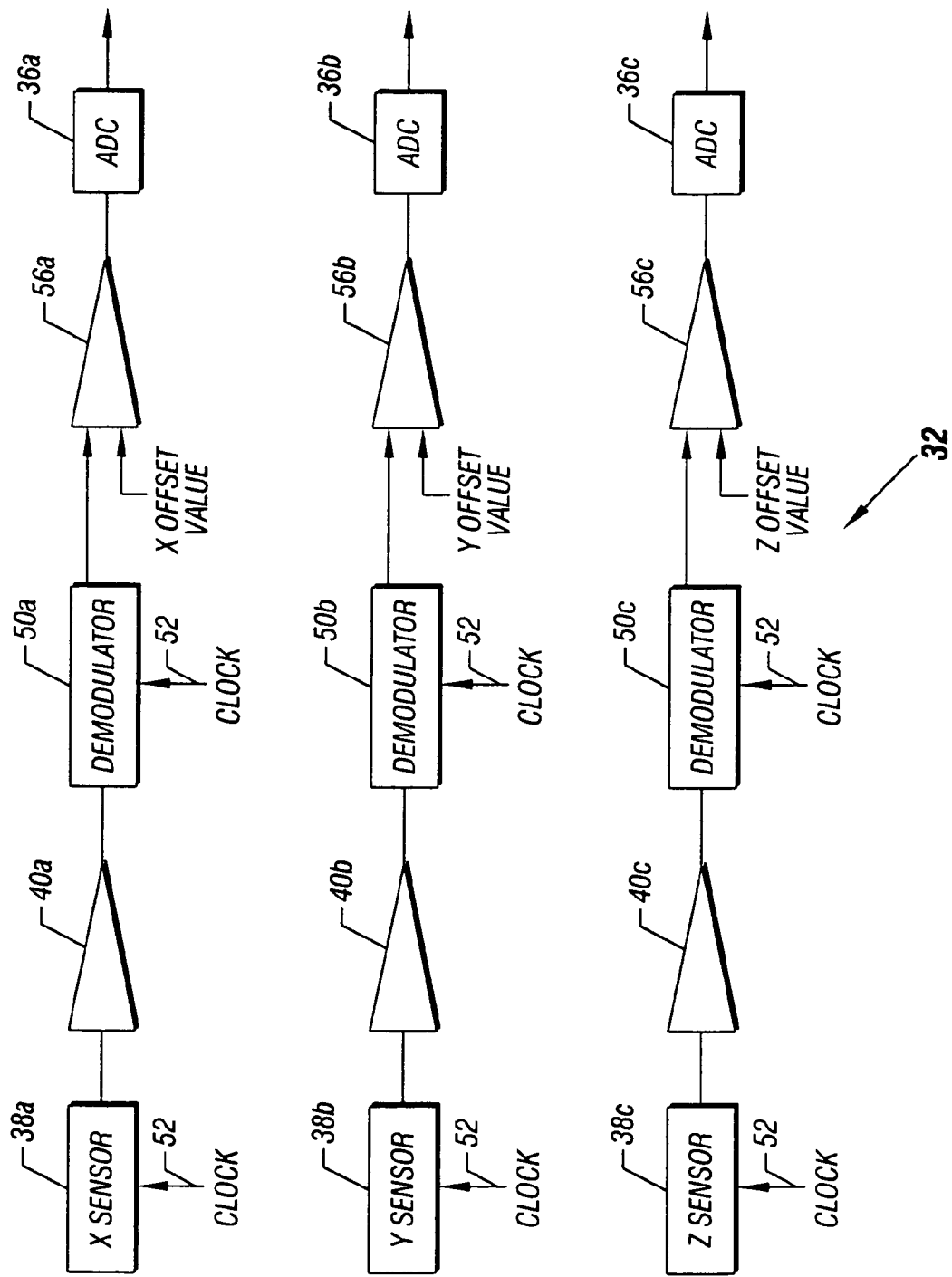
FIG. 6 is a block diagram for implementing the accelerometer shown in FIG. 5.

The accelerometer 32 may be implemented, in one embodiment of the present invention, by a single chip solid state device. A three axis solid state accelerometer 32, illustrated in FIG. 6, includes an X axis sensor 38a, a Y axis sensor 38b, and a Z axis sensor 38c. Thus, each sensor 38 measures acceleration in one of three transverse axes. Each sensor output signal is modulated by a clock signal 52 which also drives the demodulators 50a, 50b and 50c. The output signal of each sensor 38a, 38b or 38c is amplified by a gain amplifier 40a, 40b or 40c.

Each demodulated signal is adjusted by a buffer amplifier 56a, 56b and 56c. One input port of each buffer amplifier 56 is connected to a trimming or offset network which may be a resistor network. The network provides an offset or adjustment signal for each axis X, Y or Z.

The circuit 34 may use a commercially available two axis solid state accelerometer such as the ADXL250 available from Analog Devices, Norwood, Mass. 02062 and a transversely mounted single axis accelerometer such as the ADXL150 also available from Analog Devices. Other devices of this type are available from other manufacturers.

The circuit 34 may provide an X, Y and Z axis acceleration output which may be converted into a digital format by an analog to digital converters 36a, 36b or 36. A suitable analog to digital converter is a 10 bit converter such as the AD7810 also available from Analog Devices. Additional filtering may be provided to eliminate jitter. The ADXL250 and ADXL150 accelerometers may be programmed to sense a given orientation as a null position relative to gravity and thereafter to detect orientation changes along one or more of three axes.

Each acceleration sensors 38 may be a micromachined sensor element made by depositing polysilicon on a sacrificial layer that is then etched away leaving a suspended sensor beam. A differential capacitor sensor may be composed of fixed plates and moving plates attached to the beam that moves in response to acceleration. Movement of the beam changes the differential capacitance which is measured by the circuit 34.

Figure 7:
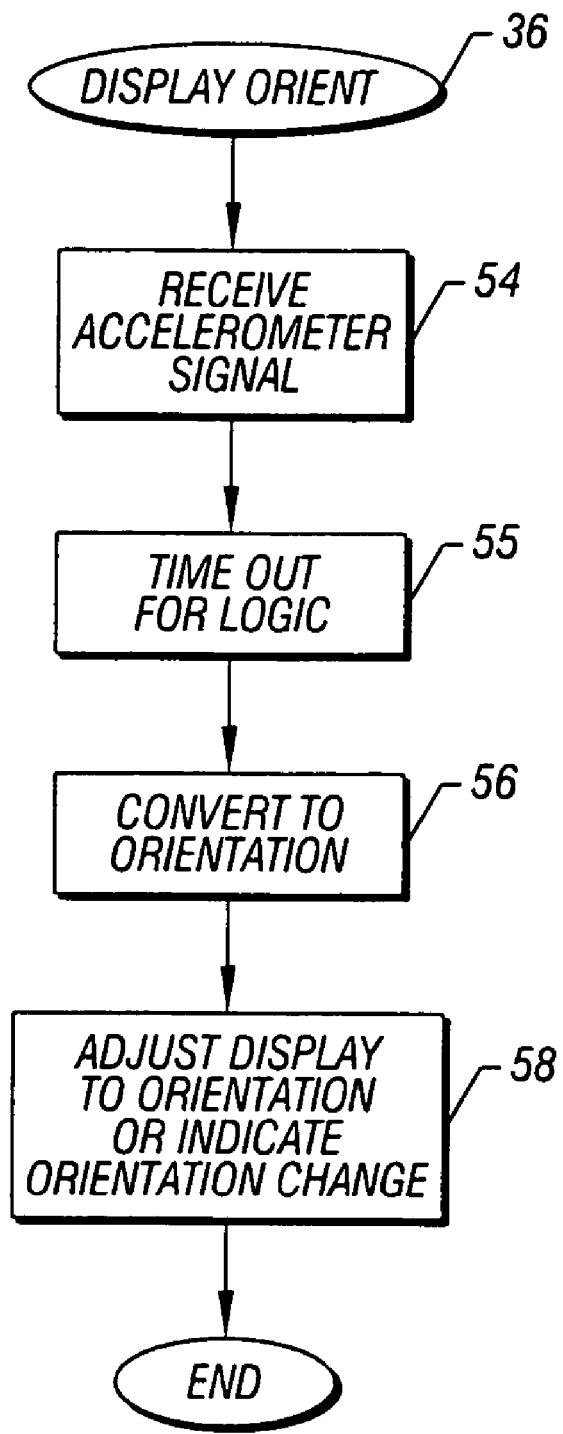
FIG. 7 is a flow chart for one embodiment of software for implementing the embodiment shown in FIG. 1.

Referring now to FIG. 7, the software 36 for changing a characteristic of the display in response to the orientation of the system 10 begins by receiving an acceleration signal, as indicated in block 54. Conventionally, the accelerometer signal may provide information about an acceleration in one of at least two transverse axes. That signal may be converted into orientation information as indicated in block 56.

In some cases it may be desirable to have a time out or integration function. This avoids software changes in response to momentary or inadvertent orientation changes.

Thus, the time out function illustrated in block 55 determines if the orientation change persisted for a sufficient period of time (for example, a half second) to indicate the operator's intent to provide a software input in the form of an orientation change. In other cases, the time out function may also operate as a filter to eliminate obviously incorrect information. For example, relatively persistent vibrations may be interpreted as being indicative of in car operation and may be discarded. Similarly, periodic handshaking of relatively small amplitude may also be recognized and may be discounted. While in the illustrated embodiment, this time out feature is accomplished in software, those skilled in the art will appreciate that the same type of operation may be done in hardware using timers or hardware integrators.

In many cases, the precise orientation of the display relative to gravity is not important. Instead, it is sufficient to know whether the display is generally oriented in, for example, one of the positions shown in FIGS. 1, 2 and 3. Thus, information from the accelerometer 32 may be compared to information in a look up table to determine which of the three preset orientations most closely corresponds to the actual information provided by the accelerometer 32.

Once an orientation is determined, a characteristic of the display may be adjusted (block 58). For example, the information displayed on the display may be rotated to orient that information along the length of the display or along its width, as the case may be. Alternatively, the aspect ratio of letters displayed on the screen may be increased or decreased in response to the angle of the display 12 relative to the housing 14. In addition, the orientation of the information on the display may be changed to either a left-handed or right-handed orientation as indicated in FIGS. 2 and 3. Other characteristics may be changed as well. In addition, the detection of a display transposition may provide a user input to control or select the operation of software on the system 10.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor-based system comprising:
a processor;
storage coupled to said processor;
a circuit including an accelerometer to automatically produce a signal indicative of the orientation of the circuit, said circuit coupled to said processor; and
software stored on said storage to cause information to be displayed in different formats depending on the orientation of said circuit, said software to compare data from said accelerometer to stored data for at least two orientations of said display and to determine which stored data best matches the accelerometer data.

2. The system of claim 1 including software to determine which stored data corresponding to one at least three orientations of said display that most closely matches said accelerometer data.

3. The system of claim 1 wherein said accelerometer data is not the same as said stored data.

4. The system of claim 1 further including a display and a housing including a keyboard, said housing hingedly connected to said display.

5. The system of claim 4 wherein said software changes an aspect ratio of information displayed on said display based on the angle of said display with respect to said housing.

6. The system of claim 4 wherein said display has a longer and a shorter axis, and said software changes the way information is displayed between a first orientation where information is displayed along the longer axis and a second orientation which information is displayed along the shorter axis.

7. The system of claim 6 wherein information is displayed in one of at least two orientations along the longer axis, each orientation inverted with respect the other.

* * * * *